(12) United States Patent
Ishikawa et al.

(10) Patent No.: US 10,213,880 B2
(45) Date of Patent: Feb. 26, 2019

(54) SOLDER ALLOY, SOLDER PASTE, AND ELECTRONIC CIRCUIT BOARD

(71) Applicant: HARIMA CHEMICALS, INCORPORATED, Hyogo (JP)

(72) Inventors: Shunsuke Ishikawa, Hyogo (JP); Kensuke Nakanishi, Hyogo (JP); Yuka Matsushima, Hyogo (JP); Tadashi Takemoto, Hyogo (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 0 days.

(21) Appl. No.: 15/505,228

(22) PCT Filed: Feb. 3, 2016

(86) PCT No.: PCT/JP2016/053143
§ 371 (c)(1),
(2) Date: Feb. 20, 2017

(87) PCT Pub. No.: WO2016/152259
PCT Pub. Date: Sep. 29, 2016

(65) Prior Publication Data
US 2017/0274480 A1    Sep. 28, 2017

(30) Foreign Application Priority Data
Mar. 24, 2015    (JP) .................. 2015-060519

(51) Int. Cl.
*B23K 35/26*    (2006.01)
*C22C 13/02*    (2006.01)
*B23K 35/02*    (2006.01)
*B23K 101/42*   (2006.01)

(52) U.S. Cl.
CPC .......... *B23K 35/262* (2013.01); *B23K 35/025* (2013.01); *B23K 35/26* (2013.01); *C22C 13/02* (2013.01); *B23K 2101/42* (2018.08)

(58) Field of Classification Search
CPC ............................ B23K 35/262; C22C 13/02
USPC ......................................................... 148/24
See application file for complete search history.

(56) References Cited

U.S. PATENT DOCUMENTS

| 5,837,191 A | 11/1998 | Gickler |
| 2004/0262779 A1* | 12/2004 | Amagai ............... B23K 35/262 257/779 |
| 2012/0175020 A1 | 7/2012 | Imamura et al. |
| 2012/0223430 A1 | 9/2012 | Terashima et al. |
| 2014/0141273 A1 | 5/2014 | Shimamura et al. |
| 2015/0183062 A1 | 7/2015 | Imamura et al. |

FOREIGN PATENT DOCUMENTS

| CN | 1346728 A | 5/2002 |
| CN | 102666002 A | 9/2012 |
| CN | 102699563 A | 10/2012 |
| JP | 2004-261863 A | 9/2004 |
| JP | 2012-106280 A | 6/2012 |
| JP | 2014-8523 A | 1/2014 |
| KR | 10-2013-0014913 A | 2/2013 |
| WO | WO 2012/128356 A1 | 9/2012 |

OTHER PUBLICATIONS

International Search Report (PCT/ISA/210) dated Dec. 8, 2015, by the Japanese Patent Office as the International Searching Authority for International Application No. PCT/JP2016/053143.
Written Opinion (PCT/ISA/237) dated Dec. 8, 2015, by the Japanese Patent Office as the International Searching Authority for International Application No. PCT/JP2016/053143.
PCT International Preliminary Report on Patentability (IPRP) and Written Opinion dated Oct. 5, 2017, in corresponding International Application No. PCT/JP2016/053143 (11 pages).

* cited by examiner

*Primary Examiner* — Weiping Zhu
(74) *Attorney, Agent, or Firm* — Buchanan, Ingersoll & Rooney PC

(57) ABSTRACT

In a solder alloy consisting essentially of tin, silver, copper, bismuth, antimony, indium, and nickel, the content ratio of the silver is 0.05 mass % or more and below 0.2 mass %; the content ratio of the copper is 0.1 mass % or more and 1 mass % or less; the content ratio of the bismuth is above 4.0 mass % and 10 mass % or less; the content ratio of the antimony is 0.005 mass % or more and 8 mass % or less; the content ratio of the indium is 0.005 mass % or more and 2 mass % or less; the content ratio of the nickel is 0.003 mass % or more and 0.4 mass % or less; and the content ratio of the tin is the remaining ratio and the mass ratio (Bi/Ni) of the bismuth content with respect to the nickel content is 35 or more and 1500 or less.

6 Claims, No Drawings

SOLDER ALLOY, SOLDER PASTE, AND ELECTRONIC CIRCUIT BOARD

TECHNICAL FIELD

The present invention relates to a solder alloy, a solder paste, and an electronic circuit board, to be specific, to a solder alloy, a solder paste containing the solder alloy, and furthermore, an electronic circuit board using the solder paste.

BACKGROUND ART

In metal connection in electrical and electronic devices or the like, solder connection using a solder paste has been generally used and in such a solder paste, a solder alloy containing lead has been conventionally used.

However, in view of environmental load, the use of lead has been recently required to be suppressed and thus, the development of a solder alloy without containing lead (lead-free solder alloy) has been promoted.

As such a lead-free solder alloy, for example, a tin-copper alloy, a tin-silver-copper alloy, a tin-silver-indium-bismuth alloy, a tin-bismuth alloy, and a tin-zinc alloy have been well known and among all, a tin-silver-copper alloy, a tin-silver-indium-bismuth alloy, and the like have been widely used.

Meanwhile, silver contained in the tin-silver-copper alloy is very expensive, so that a reduction of the silver content is required in terms of cost reduction. Also, the solder alloy is required to have excellent connection strength (cooling/heating fatigue resistance or the like).

In order to satisfy such requirement, for example, a tin-silver-copper solder alloy, that is, a solder alloy which consists of tin, silver, copper, nickel, antimony, bismuth, and indium; does not contain germanium except for germanium contained in impurities that are inevitably mixed; has the content ratio of the silver of above 0.05 mass % and below 0.2 mass %, the content ratio of the copper of 0.1 mass % or more and 1 mass % or less, the content ratio of the nickel of 0.01 mass % or more and 0.2 mass % or less, the content ratio of the antimony of 0.01 mass % or more and below 2.5 mass %, the content ratio of the bismuth of 0.01 mass % or more and 4 mass % or less, the content ratio of the indium of 0.005 mass % or more and 2 mass % or less, and the content ratio of the tin of the remaining ratio with respect to the total amount of the solder alloy; and has the mass ratio (Cu/Ni) of the copper content with respect to the nickel content of below 12.5 has been proposed (ref: for example, Patent Document 1).

According to the solder alloy, a cost reduction can be achieved and excellent connection strength (cooling/heating fatigue resistance or the like) can be also obtained.

CITATION LIST

Patent Document

Patent Document 1: Japanese Unexamined Patent Publication No. 2014-008523

SUMMARY OF THE INVENTION

Problem to be Solved by the Invention

Meanwhile, in order to improve the workability in soldering and to suppress damage of a member to be soldered, a solder alloy may be required to achieve a low melting point thereof and a reduction of the reflow temperature (for example, below 240° C.). Also, the solder alloy is required to have excellent connection strength at the time of soldering at a relatively low reflow temperature.

It is an object of the present invention to provide a solder alloy capable of achieving a cost reduction and a low melting point and furthermore, having excellent connection strength; a solder paste containing the solder alloy; and furthermore, an electronic circuit board using the solder paste.

Means for Solving the Problem

The present invention [1] includes a solder alloy consisting essentially of tin, silver, copper, bismuth, antimony, indium, and nickel, wherein with respect to the total amount of the solder alloy, the content ratio of the silver is 0.05 mass % or more and below 0.2 mass %; the content ratio of the copper is 0.1 mass % or more and 1 mass % or less; the content ratio of the bismuth is above 4.0 mass % and 10 mass % or less; the content ratio of the antimony is 0.005 mass % or more and 8 mass % or less; the content ratio of the indium is 0.005 mass % or more and 2 mass % or less; the content ratio of the nickel is 0.003 mass % or more and 0.4 mass % or less; and the content ratio of the tin is the remaining ratio and the mass ratio (Bi/Ni) of the bismuth content with respect to the nickel content is 35 or more and 1500 or less.

The present invention [2] includes the solder alloy described in the above-described [1], wherein the content ratio of the bismuth is above 4.0 mass % and 6.5 mass % or less.

The present invention [3] includes the solder alloy described in the above-described [1] or [2], wherein the content ratio of the antimony is 0.01 mass % or more and 2.5 mass % or less.

The present invention [4] includes the solder alloy described in any one of the above-described [1] to [3], wherein the mass ratio (Bi/Ni) of the bismuth content with respect to the nickel content is 40 or more and 250 or less.

The present invention [5] includes the solder alloy described in any one of the above-described [1] to [4] further containing cobalt, wherein the content ratio of the cobalt is 0.001 mass % or more and 0.1 mass % or less.

The present invention [6] includes the solder alloy described in any one of the above-described [1] to [5] further containing at least one element selected from the group consisting of germanium, gallium, iron, and phosphorus, wherein the content ratio of the element with respect to the total amount of the solder alloy is above 0 mass % and 1 mass % or less.

The present invention [7] includes a solder paste containing a solder powder made from the solder alloy described in any one of the above-described [1] to [6] and flux.

The present invention [8] includes an electronic circuit board including a soldering portion soldered by the solder paste described in the above-described [7].

Effect of the Invention

In the solder alloy consisting essentially of tin, silver, copper, bismuth, antimony, indium, and nickel, the solder alloy according to one aspect of the present invention is formulated so that the content ratio of each of the components is the above-described predetermined amount.

Thus, the solder alloy according to one aspect of the present invention is capable of achieving a cost reduction and a low melting point and furthermore, ensuring excellent connection strength (cooling/heating fatigue resistance or the like).

The solder paste according to one aspect of the present invention contains the solder alloy of the present invention, so that it is capable of achieving a cost reduction and a low melting point and furthermore, ensuring excellent connection strength (cooling/heating fatigue resistance or the like).

The electronic circuit board of the present invention uses the solder paste of the present invention in soldering, so that it is capable of achieving a cost reduction and a low melting point and furthermore, ensuring excellent connection strength (cooling/heating fatigue resistance or the like).

DESCRIPTION OF EMBODIMENTS

A solder alloy according to one aspect of the present invention contains, as essential components, tin (Sn), silver (Ag), copper (Cu), bismuth (Bi), antimony (Sb), indium (In), and nickel (Ni). In other words, the solder alloy consists essentially of tin, silver, copper, bismuth, antimony, indium, and nickel. In the specification, "essentially" means that allowing the above-described elements to be essential components and an optional component to be described later to be contained at a proportion to be described later.

In the solder alloy, the content ratio of the tin is the remaining ratio of each of the components to be described later and is appropriately set in accordance with the mixing amount of each of the components.

The content ratio of the silver with respect to the total amount of the solder alloy is 0.05 mass % or more, preferably above 0.05 mass %, or more preferably 0.08 mass % or more and below 0.2 mass %, or preferably 0.18 mass % or less.

When the content ratio of the silver is within the above-described range, a cost reduction can be achieved. Also, the content ratio of the other metals is set within a range to be described later, so that when the content ratio of the silver in the solder alloy is set low as described above, excellent connection strength can be obtained and furthermore, a low melting point can be achieved.

On the other hand, when the content ratio of the silver is below the above-described lower limit, the connection strength is poor. Also, when the content ratio of the silver is above the above-described upper limit, a cost is increased and in the case where cobalt to be described later is mixed, the exhibition in effect (improvement of the connection strength) based on cobalt is inhibited.

The content ratio of the copper with respect to the total amount of the solder alloy is 0.1 mass % or more, or preferably 0.3 mass % or more and 1 mass % or less, or preferably 0.8 mass % or less.

When the content ratio of the copper is within the above-described range, excellent connection strength can be obtained and a low melting point can be achieved.

On the other hand, when the content ratio of the copper is below the above-described lower limit, there is a disadvantage that a low melting point cannot be achieved; workability in soldering is poor, and damage to a member to be soldered occurs. Also, when the content ratio of the copper is above the above-described upper limit, there is a disadvantage that a low melting point cannot be achieved; workability in soldering is poor; and damage to a member to be soldered occurs.

The content ratio of the bismuth with respect to the total amount of the solder alloy is above 4 mass %, or preferably 4.1 mass % or more and 10 mass % or less, or preferably 6.5 mass % or less.

When the content ratio of the bismuth is within the above-described range and the mass ratio (Bi/Ni) of the bismuth to the nickel is within the range to be described later, excellent connection strength can be obtained and a low melting point can be achieved.

On the other hand, when the content ratio of the bismuth is below the above-described lower limit, there is a disadvantage that a low melting point cannot be achieved; workability in soldering is poor; and damage to a member to be soldered occurs. When the content ratio of the bismuth is above the above-described upper limit, the connection strength is poor.

The content ratio of the antimony with respect to the total amount of the solder alloy is 0.005 mass % or more, or preferably 0.01 mass % or more and 8 mass % or less, preferably 5.0 mass % or less, or more preferably 2.5 mass % or less.

When the content ratio of the antimony is within the above-described range, excellent connection strength can be obtained and a low melting point can be achieved.

On the other hand, when the content ratio of the antimony is below the above-described lower limit, the connection strength is poor. Also, when the content ratio of the antimony is above the above-described upper limit, there is a disadvantage that a low melting point cannot be achieved; workability in soldering is poor; and damage to a member to be soldered occurs.

The content ratio of the indium with respect to the total amount of the solder alloy is 0.005 mass % or more, or preferably 0.05 mass % or more and 2 mass % or less, or preferably 1 mass % or less.

When the content ratio of the indium is within the above-described range, excellent connection strength can be obtained and a low melting point can be achieved.

On the other hand, when the content ratio of the indium is below the above-described lower limit, the connection strength is poor. Also, when the content ratio of the indium is above the above-described upper limit, a cost is increased and furthermore, a void may easily occur.

The content ratio of the nickel with respect to the total amount of the solder alloy is 0.003 mass % or more, preferably 0.005 mass % or more, or more preferably 0.02 mass % or more and 0.4 mass % or less, or preferably 0.1 mass % or less.

When the content ratio of the nickel is within the above-described range and the mass ratio (Bi/Ni) of the bismuth to the nickel is within the range to be described later, excellent connection strength can be obtained and a low melting point can be achieved.

On the other hand, when the content ratio of the nickel is below the above-described lower limit, the connection strength is poor. Also, when the content ratio of the nickel is above the above-described upper limit, the connection strength is poor. Furthermore, there may be a case where a low melting point cannot be achieved; workability in soldering is poor; and damage to a member to be soldered occurs.

Also, in the solder alloy of the present invention, the mass ratio (Bi/Ni) of the bismuth content to the nickel content is 35 or more, preferably 40 or more, or more preferably 51 or more and 1500 or less, preferably 1200 or less, more preferably 250 or less, or further more preferably 77 or less.

When the mass ratio (Bi/Ni) of the nickel to the bismuth is within the above-described range, a low melting point can be achieved by increasing the content ratio of the bismuth, while excellent connection strength can be obtained.

On the other hand, when the mass ratio (Bi/Ni) of the nickel to the bismuth is below the above-described lower limit, the connection strength is poor. Also, when the mass ratio (Bi/Ni) of the nickel to the bismuth is above the above-described upper limit, the connection strength is poor.

The above-described solder alloy can further contain, as an optional component, cobalt (Co).

When the cobalt is contained as an optional component, the content ratio thereof with respect to the total amount of the solder alloy is, for example, 0.001 mass % or more, or preferably 0.002 mass % or more and, for example, 0.1 mass % or less, or preferably 0.01 mass % or less.

When the content ratio of the cobalt is within the above-described range, furthermore excellent connection strength can be obtained.

The above-described solder alloy can further contain, as an optional component, at least one kind selected from the element consisting of germanium (Ge), gallium (Ga), iron (Fe), and phosphorus (P).

When the germanium is contained as an optional component, the content ratio thereof with respect to the total amount of the solder alloy is, for example, above 0 mass % and, for example, 1.0 mass % or less.

When the content ratio of the germanium is within the above-described range, excellent effect of the present invention can be retained.

When the gallium is contained as an optional component, the content ratio thereof with respect to the total amount of the solder alloy is, for example, above 0 mass % and, for example, 1.0 mass % or less.

When the content ratio of the gallium is within the above-described range, excellent effect of the present invention can be retained.

When the iron is contained as an optional component, the content ratio thereof with respect to the total amount of the solder alloy is, for example, above 0 mass % and, for example, 1.0 mass % or less.

When the content ratio of the iron is within the above-described range, excellent effect of the present invention can be retained.

When the phosphorus is contained as an optional component, the content ratio thereof with respect to the total amount of the solder alloy is, for example, above 0 mass % and, for example, 1.0 mass % or less.

When the content ratio of the phosphorus is within the above-described range, excellent effect of the present invention can be retained.

These optional components can be used alone or in combination of two or more.

When the above-described element is contained as an optional component, the content ratio thereof (in the case of being used in combination of two or more, the total amount thereof) with respect to the total amount of the solder alloy is adjusted to be, for example, above 0 mass % and, for example, 1.0 mass % or less.

When the total amount of the content ratio of the optional components is within the above-described range, excellent effect of the present invention can be retained.

Such a solder alloy can be obtained by alloying the above-described metal components by a known method such as melting the metal components in a melting furnace to be unified.

The above-described metal components used in the production of the solder alloy can contain small amount of impurities (inevitable impurities) as long as the excellent effect of the present invention is not inhibited.

Examples of the impurities include aluminum (Al), iron (Fe), zinc (Zn), and gold (Au).

The melting point of the solder alloy obtained in this manner measured by a DSC method (measurement conditions: temperature rising rate of 0.5° C./min.) is, for example, 200° C. or more, or preferably 210° C. or more and, for example, below 240° C., preferably 230° C. or less, or more preferably 225° C. or less.

When the melting point of the solder alloy is within the above-described range, in a case where the solder alloy is used in the solder paste, metal connection can be easily performed with excellent workability and damage to a member to be soldered can be suppressed.

In the solder alloy consisting essentially of tin, silver, copper, bismuth, antimony, indium, and nickel, the above-described solder alloy is formulated so that the content ratio of each of the components is the above-described predetermined amount.

Thus, the above-described solder alloy is capable of achieving a cost reduction and a low melting point and furthermore, ensuring excellent connection strength (cooling/heating fatigue resistance or the like).

Thus, the solder alloy is preferably contained in the solder paste (solder paste connecting material).

To be specific, the solder paste according to another aspect of the present invention contains the above-described solder alloy and flux.

The solder alloy in a powdered shape is preferably contained in the solder paste.

The powdered shape is not particularly limited and examples thereof include a substantially complete sphere shape, a flat block shape, and a needle shape and may include an amorphous shape. The powdered shape is appropriately set in accordance with the properties (for example, thixotropy, viscosity, or the like) required for the solder paste.

The average particle size (in the case of sphere shape) or the average longitudinal length (in the case of not sphere shape) of the powder of the solder alloy is, for example, 5 μm or more, or preferably 15 μm or more and, for example, 100 μm or less, or preferably 50 μm or less in measurement by using a particle diameter and particle size distribution analyzer by a laser diffraction method.

The flux is not particularly limited and known solder flux can be used.

To be specific, the flux is mainly composed of, for example, a base resin (rosin, acrylic resin, or the like), an activator (for example, hydrohalogenic acid salt of amine such as ethylamine and propylamine and organic carboxylic acid such as lactic acid, citric acid, and benzoic acid), and a thixotropic agent (hardened castor oil, bees wax, carnauba wax, or the like) and can further contain an organic solvent when liquid flux is used.

The solder paste can be obtained by mixing the powder made from the above-described solder alloy with the above-described flux by a known method.

The mixing ratio of the solder alloy to the flux, as solder alloy:flux (mass ratio), is, for example, 70:30 to 95:5.

The above-described solder paste contains the above-described solder alloy, so that it is capable of achieving a cost reduction and a low melting point and furthermore, ensuring excellent connection strength (cooling/heating fatigue resistance or the like).

The present invention includes an electronic circuit board including a soldering portion soldered by the above-described solder paste.

That is, the above-described solder paste is preferably used in, for example, soldering (metal connection) of an electrode of a printed board such as an electrical and electronic device with an electronic component.

In other words, the electronic circuit board includes a printed board having an electrode; an electronic component; and a soldering portion that metal-connects the electrode to the electronic component, and the electronic circuit board is formed by allowing the soldering portion to reflow the above-described solder paste.

The electronic component is not particularly limited and an example thereof includes a known electronic component such as chip components (IC chip or the like), resistors, diodes, condensers, and transistors.

Also, the electronic circuit board uses the above-described solder paste in soldering, so that it is capable of achieving a cost reduction and a low melting point and furthermore, ensuring excellent connection strength (cooling/heating fatigue resistance or the like).

The usage of the above-described solder alloy is not limited to the above-described solder paste and can be also used in, for example, the production of a resin flux cored solder connecting material. To be specific, for example, the above-described solder alloy is formed into a linear shape with the above-described flux as a core by a known method (for example, extrusion molding or the like), so that the resin flux cored solder connecting material can be also obtained.

Such a resin flux cored solder connecting material is also preferably used in, for example, soldering (metal connection) of an electronic circuit board such as an electrical and electronic device in the same manner as that of the solder paste.

EXAMPLES

The present invention will hereinafter be described based on Examples and Comparative Examples. The present invention is however not limited by the following Examples. All designations of "part" or "parts" and "%" mean part or parts by mass and % by mass, respectively, unless otherwise particularly specified. The specific numerical values in mixing ratio (content ratio), property value, and parameter used in the following description will be replaced with upper limits (numerical values defined as "or less" or "below") or lower limits (numerical values defined as "or more" or "above") of corresponding numerical values in mixing ratio (content ratio), property value, and parameter described in the above-described "DESCRIPTION OF EMBODIMENTS".

Examples 1 to 54 and Comparative Examples 1 to 10

Preparation of Solder Alloy

The powder of each of the metals described in Tables 1 to 2 was mixed at the mixing ratio described in Tables 1 to 2 and each of the obtained metal mixtures was melted to be unified in a melting furnace, thereby preparing solder alloys.

The mixing ratio of tin (Sn) in each of the mixing formulations in Examples and Comparative Examples is a remaining ratio obtained by subtracting the mixing ratio (mass %) of the metals (silver (Ag), copper (Cu), bismuth (Bi), antimony (Sb), indium (In), nickel (Ni), cobalt (Co), germanium (Ge), gallium (Ga), iron (Fe), and phosphorus (P)) described in Tables 1 to 2 from the total amount of the solder alloy. In tables, the remaining portion is described as "Bal.".

Example 1 is a solder alloy obtained by mixing Ag, Cu, Bi, Sb, In, and Ni at a ratio shown in Table 1 and Sn as the remaining content.

Examples 2 to 35 are an example of the formulation in which the mixing ratio of Bi and/or Ni are/is increased or decreased and the value of the mass ratio (Bi/Ni) thereof is changed with respect to the formulation in Example 1.

Examples 36 to 42 are an example of the formulation in which Co is further mixed and the content ratio of Co is increased or decreased with respect to the formulation in Example 10.

Examples 43 to 46 are an example of the formulation in which any one of Ge, Ga, Fe, and P is added with respect to the formulation in Example 38.

Examples 47 to 48 are an example of the formulation in which the content ratio of Ag is increased or decreased with respect to the formulation in Example 38.

Examples 49 to 52 are an example of the formulation in which the content ratio of Sb is increased or decreased with respect to the formulation in Example 38.

Examples 53 to 54 are an example of the formulation in which the content ratio of In is increased or decreased with respect to the formulation in Example 38.

Comparative Examples 1 to 2 are an example of the formulation in which the mixing ratio of Bi is increased or decreased to be excessive or insufficient with respect to the formulation in Example 10.

Comparative Example 3 is an example of the formulation in which the mixing ratio of Ni is decreased to be insufficient and the mass ratio (Bi/Ni) of Bi to Ni is excessive with respect to the formulation in Example 10.

Comparative Example 4 is an example of the formulation in which the mixing ratio of Ni is increased to be excessive and the mass ratio (Bi/Ni) of Bi to Ni is short with respect to the formulation in Example 10.

Comparative Example 5 is an example of the formulation in which the mixing ratio of Ni is decreased and the mass ratio (Bi/Ni) of Bi to Ni is excessive with respect to the formulation in Example 13.

Comparative Example 6 is an example of the formulation in which the mixing ratio of Ni is increased and the mass ratio (Bi/Ni) of Bi to Ni is short with respect to the formulation in Example 13.

Comparative Example 7 is an example of the formulation in which the mixing ratio of Ni is decreased and the mass ratio (Bi/Ni) of Bi to Ni is excessive with respect to the formulation in Example 19.

Comparative Example 8 is an example of the formulation in which the mixing ratio of Ni is increased and the mass ratio (Bi/Ni) of Bi to Ni is short with respect to the formulation in Example 19.

Comparative Example 9 is an example of the formulation in which the mixing ratio of Ni is decreased and the mass ratio (Bi/Ni) of Bi to Ni is excessive with respect to the formulation in Example 24.

Comparative Example 10 is an example of the formulation in which the mixing ratio of Ni is decreased and the mass ratio (Bi/Ni) of Bi to Ni is excessive with respect to the formulation in Example 30.

Comparative Examples 11 to 12 are an example of the formulation in which the mixing ratio of Cu is increased or decreased to be excessive or insufficient with respect to the formulation in Example 10.

Comparative Examples 13 to 14 are an example of the formulation in which the mixing ratio of Sb is increased or decreased to be excessive or insufficient with respect to the formulation in Example 10.

Preparation of Solder Paste

The obtained solder alloy was powdered so that the particle size thereof was 25 to 38 μm. The obtained powder of the solder alloy was mixed with known flux, thereby obtaining a solder paste.

Evaluation of Solder Paste

The obtained solder paste was printed on a chip component-mounted printed board and a chip component was mounted thereon by a reflow method. The printing conditions of the solder paste at the time of mounting, the size of the chip component, and the like were appropriately set in accordance with each of the evaluations to be described later. The results are shown in Tables 3 to 4.

TABLE 1

| | Mixing Formulation (Mass %) | | | | | | | | | | | | |
|---|---|---|---|---|---|---|---|---|---|---|---|---|---|
| No. | Sn | Ag | Cu | Bi | Sb | In | Ni | Co | Ge | Ga | Fe | P | Bi/Ni |
| Ex. 1 | Bal. | 0.1 | 0.7 | 4.1 | 0.08 | 0.5 | 0.003 | — | — | — | — | — | 1367 |
| Ex. 2 | Bal. | 0.1 | 0.7 | 4.1 | 0.08 | 0.5 | 0.01 | — | — | — | — | — | 410 |
| Ex. 3 | Bal. | 0.1 | 0.7 | 4.1 | 0.08 | 0.5 | 0.03 | — | — | — | — | — | 137 |
| Ex. 4 | Bal. | 0.1 | 0.7 | 4.1 | 0.08 | 0.5 | 0.065 | — | — | — | — | — | 63 |
| Ex. 5 | Bal. | 0.1 | 0.7 | 4.1 | 0.08 | 0.5 | 0.08 | — | — | — | — | — | 51 |
| Ex. 6 | Bal. | 0.1 | 0.7 | 4.1 | 0.08 | 0.5 | 0.1 | — | — | — | — | — | 41 |
| Ex. 7 | Bal. | 0.1 | 0.7 | 4.5 | 0.08 | 0.5 | 0.003 | — | — | — | — | — | 1500 |
| Ex. 8 | Bal. | 0.1 | 0.7 | 4.5 | 0.08 | 0.5 | 0.01 | — | — | — | — | — | 450 |
| Ex. 9 | Bal. | 0.1 | 0.7 | 4.5 | 0.08 | 0.5 | 0.03 | — | — | — | — | — | 150 |
| Ex. 10 | Bal. | 0.1 | 0.7 | 4.5 | 0.08 | 0.5 | 0.065 | — | — | — | — | — | 69 |
| Ex. 11 | Bal. | 0.1 | 0.7 | 4.5 | 0.08 | 0.5 | 0.08 | — | — | — | — | — | 56 |
| Ex. 12 | Bal. | 0.1 | 0.7 | 4.5 | 0.08 | 0.5 | 0.1 | — | — | — | — | — | 45 |
| Ex. 13 | Bal. | 0.1 | 0.7 | 5 | 0.08 | 0.5 | 0.005 | — | — | — | — | — | 1000 |
| Ex. 14 | Bal. | 0.1 | 0.7 | 5 | 0.08 | 0.5 | 0.01 | — | — | — | — | — | 500 |
| Ex. 15 | Bal. | 0.1 | 0.7 | 5 | 0.08 | 0.5 | 0.03 | — | — | — | — | — | 167 |
| Ex. 16 | Bal. | 0.1 | 0.7 | 5 | 0.08 | 0.5 | 0.065 | — | — | — | — | — | 77 |
| Ex. 17 | Bal. | 0.1 | 0.7 | 5 | 0.08 | 0.5 | 0.08 | — | — | — | — | — | 63 |
| Ex. 18 | Bal. | 0.1 | 0.7 | 5 | 0.08 | 0.5 | 0.1 | — | — | — | — | — | 50 |
| Ex. 19 | Bal. | 0.1 | 0.7 | 6.5 | 0.08 | 0.5 | 0.01 | — | — | — | — | — | 650 |
| Ex. 20 | Bal. | 0.1 | 0.7 | 6.5 | 0.08 | 0.5 | 0.03 | — | — | — | — | — | 217 |
| Ex. 21 | Bal. | 0.1 | 0.7 | 6.5 | 0.08 | 0.5 | 0.065 | — | — | — | — | — | 100 |
| Ex. 22 | Bal. | 0.1 | 0.7 | 6.5 | 0.08 | 0.5 | 0.08 | — | — | — | — | — | 61 |
| Ex. 23 | Bal. | 0.1 | 0.7 | 6.5 | 0.08 | 0.5 | 0.1 | — | — | — | — | — | 65 |
| Ex. 24 | Bal. | 0.1 | 0.7 | 8 | 0.08 | 0.5 | 0.01 | — | — | — | — | — | 800 |
| Ex. 25 | Bal. | 0.1 | 0.7 | 8 | 0.08 | 0.5 | 0.03 | — | — | — | — | — | 267 |
| Ex. 26 | Bal. | 0.1 | 0.7 | 8 | 0.08 | 0.5 | 0.065 | — | — | — | — | — | 123 |
| Ex. 27 | Bal. | 0.1 | 0.7 | 8 | 0.08 | 0.5 | 0.08 | — | — | — | — | — | 100 |
| Ex. 28 | Bal. | 0.1 | 0.7 | 8 | 0.08 | 0.5 | 0.1 | — | — | — | — | — | 80 |
| Ex. 29 | Bal. | 0.1 | 0.7 | 8 | 0.08 | 0.5 | 0.2 | — | — | — | — | — | 40 |
| Ex. 30 | Bal. | 0.1 | 0.7 | 10 | 0.08 | 0.5 | 0.01 | — | — | — | — | — | 1000 |
| Ex. 31 | Bal. | 0.1 | 0.7 | 10 | 0.08 | 0.5 | 0.03 | — | — | — | — | — | 333 |
| Ex. 32 | Bal. | 0.1 | 0.7 | 10 | 0.08 | 0.5 | 0.065 | — | — | — | — | — | 154 |
| Ex. 33 | Bal. | 0.1 | 0.7 | 10 | 0.08 | 0.5 | 0.08 | — | — | — | — | — | 125 |
| Ex. 34 | Bal. | 0.1 | 0.7 | 10 | 0.08 | 0.5 | 0.1 | — | — | — | — | — | 100 |
| Ex. 35 | Bal. | 0.1 | 0.7 | 10 | 0.08 | 0.5 | 0.2 | — | — | — | — | — | 50 |

TABLE 2

| | Mixing Formulation (Mass %) | | | | | | | | | | | | |
|---|---|---|---|---|---|---|---|---|---|---|---|---|---|
| No. | Sn | Ag | Cu | Bi | Sb | In | Ni | Co | Ge | Ga | Fe | P | Bi/Ni |
| Ex. 35 | Bal. | 0.1 | 0.7 | 4.5 | 0.08 | 0.5 | 0.065 | 0.001 | — | — | — | — | 69 |
| Ex. 37 | Bal. | 0.1 | 0.7 | 4.5 | 0.08 | 0.5 | 0.065 | 0.002 | — | — | — | — | 69 |
| Ex. 38 | Bal. | 0.1 | 0.7 | 4.5 | 0.08 | 0.5 | 0.065 | 0.003 | — | — | — | — | 69 |
| Ex. 39 | Bal. | 0.1 | 0.7 | 4.5 | 0.08 | 0.5 | 0.065 | 0.005 | — | — | — | — | 69 |
| Ex. 40 | Bal. | 0.1 | 0.7 | 4.5 | 0.08 | 0.5 | 0.065 | 0.01 | — | — | — | — | 69 |
| Ex. 41 | Bal. | 0.1 | 0.7 | 4.5 | 0.08 | 0.5 | 0.065 | 0.05 | — | — | — | — | 69 |
| Ex. 42 | Bal. | 0.1 | 0.7 | 4.5 | 0.08 | 0.5 | 0.065 | 0.1 | — | — | — | — | 69 |
| Ex. 43 | Bal. | 0.1 | 0.7 | 4.5 | 0.08 | 0.5 | 0.065 | 0.003 | 0.1 | — | — | — | 69 |
| Ex. 44 | Bal. | 0.1 | 0.7 | 4.5 | 0.08 | 0.5 | 0.065 | 0.003 | — | 0.1 | — | — | 69 |
| Ex. 45 | Bal. | 0.1 | 0.7 | 4.5 | 0.08 | 0.5 | 0.065 | 0.003 | — | — | 0.1 | — | 69 |
| Ex. 46 | Bal. | 0.1 | 0.7 | 4.5 | 0.08 | 0.5 | 0.065 | 0.003 | — | — | — | 0.1 | 69 |
| Ex. 47 | Bal. | 0.08 | 0.7 | 4.5 | 0.08 | 0.5 | 0.065 | 0.003 | — | — | — | — | 69 |
| Ex. 48 | Bal. | 0.18 | 0.7 | 4.5 | 0.08 | 0.5 | 0.065 | 0.003 | — | — | — | — | 69 |
| Ex. 49 | Bal. | 0.1 | 0.7 | 4.5 | 0.01 | 0.5 | 0.065 | 0.003 | — | — | — | — | 69 |
| Ex. 50 | Bal. | 0.1 | 0.7 | 4.6 | 2.5 | 0.5 | 0.065 | 0.003 | — | — | — | — | 69 |
| Ex. 51 | Bal. | 0.1 | 0.7 | 10 | 5 | 0.5 | 0.01 | 0.003 | — | — | — | — | 1000 |
| Ex. 52 | Bal. | 0.1 | 0.7 | 10 | 8 | 0.5 | 0.01 | 0.003 | — | — | — | — | 1000 |
| Ex. 53 | Bal. | 0.1 | 0.7 | 4.5 | 0.08 | 0.005 | 0.065 | 0.003 | — | — | — | — | 69 |
| Ex. 54 | Bal. | 0.1 | 0.7 | 4.5 | 0.08 | 2 | 0.065 | 0.003 | — | — | — | — | 69 |
| Comp. Ex. 1 | Bal. | 0.1 | 0.7 | 3.2 | 0.08 | 0.5 | 0.065 | — | — | — | — | — | 49 |

TABLE 2-continued

Mixing Formulation (Mass %)

| No. | Sn | Ag | Cu | Bi | Sb | In | Ni | Co | Ge | Ga | Fe | P | Bi/Ni |
|---|---|---|---|---|---|---|---|---|---|---|---|---|---|
| Comp. Ex. 2 | Bal. | 0.1 | 0.7 | 11 | 0.08 | 0.5 | 0.15 | — | — | — | — | — | 73 |
| Comp. Ex. 3 | Bal. | 0.1 | 0.7 | 4.5 | 0.08 | 0.5 | 0.002 | — | — | — | — | — | 2250 |
| Comp. Ex. 4 | Bal. | 0.1 | 0.7 | 4.5 | 0.08 | 0.5 | 0.5 | — | — | — | — | — | 9 |
| Comp. Ex. 5 | Bal. | 0.1 | 0.7 | 5 | 0.08 | 0.5 | 0.003 | — | — | — | — | — | 1667 |
| Comp. Ex. 6 | Bal. | 0.1 | 0.7 | 5 | 0.08 | 0.5 | 0.2 | — | — | — | — | — | 25 |
| Comp. Ex. 7 | Bal. | 0.1 | 0.7 | 6.5 | 0.08 | 0.5 | 0.003 | — | — | — | — | — | 2167 |
| Comp. Ex. 8 | Bal. | 0.1 | 0.7 | 6.5 | 0.08 | 0.5 | 0.2 | — | — | — | — | — | 33 |
| Comp. Ex. 9 | Bal. | 0.1 | 0.7 | 8 | 0.08 | 0.5 | 0.005 | — | — | — | — | — | 1000 |
| Comp. Ex. 10 | Bal. | 0.1 | 0.7 | 10 | 0.08 | 0.5 | 0.005 | — | — | — | — | — | 2000 |
| Comp. Ex. 11 | Bal. | 0.1 | 0.05 | 4.5 | 0.08 | 0.5 | 0.065 | — | — | — | — | — | 69 |
| Comp. Ex. 12 | Bal. | 0.1 | 1.2 | 4.5 | 0.08 | 0.5 | 0.065 | — | — | — | — | — | 69 |
| Comp. Ex. 13 | Bal. | 0.1 | 0.7 | 4.5 | 0.002 | 0.5 | 0.065 | — | — | — | — | — | 69 |
| Comp. Ex. 14 | Bal. | 0.1 | 0.7 | 4.5 | 8.5 | 0.5 | 0.065 | — | — | — | — | — | 69 |

<Evaluation>
<Wettability>

After each of the solder pastes obtained in Examples and Comparative Examples was After cooling the printed on a chip component-mounted printed board, the printed board was headed under the same conditions as those at the time of mounting a chip component by a reflow method, so that the solder alloy in the solder paste was dissolved. As the printed board, a printed board for mounting a chip component having a 0603 size (6 mm×3 mm) was used. The printing film thickness of the solder paste was adjusted using a metal mask having a thickness of 120 μm.

At this time, the reflow temperature (peak temperature of reflow) was set to be 225° C.

After cooling the printed board, the melting state of the solder on the printed board was observed with an optical microscope and the meltability of the solder (i.e. "wettability of the solder") was evaluated in accordance with the following criteria.

As the printed places of the solder paste, there were 20 places in total in one piece of printed board. By observing all the printed places in the printed board, the wettability of the solder was evaluated in accordance with the following criteria.

Excellent: the solder was completely melted, and the wettability of the solder was excellent.

Good: some of the solder particles which were unmelted residues of the solder alloy were observed.

Bad: the unmelted residues of the solder alloy were remarkable, and the wettability of the solder was insufficient.

A case having excellent wettability at the above-described reflow temperature was judged as the one having a relatively low melting point.

<Connection Durability>

Each of the solder pastes obtained in Examples and Comparative Examples was printed on a chip component-mounted printed board and a chip component was mounted thereon by a reflow method. The printing film thickness of the solder paste was adjusted using a metal mask having a thickness of 150 μm. After the printing of the solder paste, the chip component having a 3216 size (32 mm×16 mm) was mounted on a predetermined position of the above-described printed board to be then subjected to reflow.

At this time, the reflow temperature (peak temperature of reflow) was set to be 225° C.

The printed board mounted with the chip component was subjected to a cooling/heating cycle test. In the cooling/heating cycle test, after the test board was set in a cooling/heating cycle tank, a series of operations in which the test board was retained under the environment of −40° C. for 30 minutes and next, retained under the environment of 125° C. for 30 minutes were repeated by 1500 cycles.

The connection strength of the chip component after the elapse of 1500 cycles (after the durability test) was measured using a bond tester (manufactured by DAGE). The shear rate of the chip component at the time of measurement was set to be 100 μm/sec. and the connection strength was defined as the average value in the total number of 30 of the mounted chip components.

The connection durability (cooling/heating fatigue resistance) was relatively evaluated in accordance with the following criteria based on the connection strength of the chip component after the elapse of 1500 cycles at the time of being subjected to the cooling/heating cycle test using the solder paste in Comparative Example 1.

Highly Excellent: a larger value of 10% or more with respect to the connection strength (after the durability test) in Comparative Example 1 was shown, and the cooling/heating fatigue resistance was excellent.

Excellent: a larger value of 5% or more with respect to the connection strength (after the durability test) in Comparative Example 1 was shown, and the cooling/heating fatigue resistance was excellent.

Good: a difference with the connection strength (after the durability test) in Comparative Example 1 was below ±5%.

Bad: a smaller value of 5% or more with respect to the connection strength (after the durability test) in Comparative Example 1 was shown, and the cooling/heating fatigue resistance was insufficient.

A case having excellent connection durability (cooling/heating fatigue resistance) at the above-described reflow temperature was judged as the one having excellent connection strength.

<Comprehensive Evaluation>

Comprehensive Judgement of Evaluation

As for each of the evaluations of the above-described "Wettability" and "Connection Durability", the total grading was calculated with the evaluation "Highly Excellent" as four points, the evaluation "Excellent" as three points, the evaluation "Good" as two points, and the evaluation "Bad" as one point. Next, based on the total grading, each of the solder pastes obtained by Examples and Comparative Examples was comprehensively evaluated in accordance with the following criteria.

Highly Excellent: Highly excellent (the total grading was seven points)

Excellent: Excellent (the total grading was six points)

Good: Generally good (the total grading was three to five points)

Bad: Bad (a case in which the total grading was two points or less, or at least one evaluation of "Bad" was included)

TABLE 3

| No. | Wettability | Connection Durability | Comprehensive Evaluation |
|---|---|---|---|
| Ex. 1 | Excellent | Good | Good |
| Ex. 2 | Excellent | Good | Good |
| Ex. 3 | Excellent | Excellent | Excellent |
| Ex. 4 | Excellent | Excellent | Excellent |
| Ex. 5 | Excellent | Excellent | Excellent |
| Ex. 6 | Excellent | Excellent | Excellent |
| Ex. 7 | Excellent | Good | Good |
| Ex. 8 | Excellent | Good | Good |
| Ex. 9 | Excellent | Excellent | Excellent |
| Ex. 10 | Excellent | Excellent | Excellent |
| Ex. 11 | Excellent | Excellent | Excellent |
| Ex. 12 | Excellent | Excellent | Excellent |
| Ex. 13 | Excellent | Good | Good |
| Ex. 14 | Excellent | Good | Good |
| Ex. 15 | Excellent | Excellent | Excellent |
| Ex. 16 | Excellent | Excellent | Excellent |
| Ex. 17 | Excellent | Excellent | Excellent |
| Ex. 18 | Excellent | Excellent | Excellent |
| Ex. 19 | Excellent | Good | Good |
| Ex. 20 | Excellent | Excellent | Excellent |
| Ex. 21 | Excellent | Excellent | Excellent |
| Ex. 22 | Excellent | Excellent | Excellent |
| Ex. 23 | Excellent | Excellent | Excellent |
| Ex. 24 | Excellent | Good | Good |
| Ex. 25 | Excellent | Good | Good |
| Ex. 26 | Excellent | Good | Good |
| Ex. 27 | Excellent | Good | Good |
| Ex. 28 | Excellent | Good | Good |
| Ex. 29 | Excellent | Good | Good |
| Ex. 30 | Excellent | Good | Good |
| Ex. 31 | Excellent | Good | Good |
| Ex. 32 | Excellent | Good | Good |
| Ex. 33 | Excellent | Good | Good |
| Ex. 34 | Excellent | Good | Good |
| Ex. 35 | Excellent | Good | Good |

TABLE 4

| No. | Wettability | Connection Durability | Comprehensive Evaluation |
|---|---|---|---|
| Ex. 36 | Excellent | Highly Excellent | Highly Excellent |
| Ex. 37 | Excellent | Highly Excellent | Highly Excellent |
| Ex. 38 | Excellent | Highly Excellent | Highly Excellent |
| Ex. 39 | Excellent | Highly Excellent | Highly Excellent |
| Ex. 40 | Excellent | Highly Excellent | Highly Excellent |
| Ex. 41 | Excellent | Highly Excellent | Highly Excellent |
| Ex. 42 | Excellent | Highly Excellent | Highly Excellent |
| Ex. 43 | Excellent | Highly Excellent | Highly Excellent |
| Ex. 44 | Excellent | Highly Excellent | Highly Excellent |
| Ex. 45 | Excellent | Highly Excellent | Highly Excellent |
| Ex. 46 | Excellent | Highly Excellent | Highly Excellent |
| Ex. 47 | Excellent | Excellent | Excellent |
| Ex. 48 | Excellent | Excellent | Excellent |
| Ex. 49 | Excellent | Excellent | Excellent |
| Ex. 50 | Excellent | Excellent | Excellent |
| Ex. 51 | Excellent | Excellent | Excellent |
| Ex. 52 | Excellent | Good | Good |
| Ex. 53 | Excellent | Excellent | Excellent |
| Ex. 54 | Excellent | Excellent | Excellent |
| Comp. Ex. 1 | Bad | Good | Bad |
| Comp. Ex. 2 | Excellent | Bad | Bad |
| Comp. Ex. 3 | Excellent | Bad | Bad |
| Comp. Ex. 4 | Bad | Bad | Bad |
| Comp. Ex. 5 | Excellent | Bad | Bad |
| Comp. Ex. 6 | Excellent | Bad | Bad |
| Comp. Ex. 7 | Excellent | Bad | Bad |
| Comp. Ex. 8 | Excellent | Bad | Bad |
| Comp. Ex. 9 | Excellent | Bad | Bad |
| Comp. Ex. 10 | Excellent | Bad | Bad |
| Comp. Ex. 11 | Bad | Excellent | Bad |
| Comp. Ex. 12 | Bad | Excellent | Bad |
| Comp. Ex. 13 | Excellent | Bad | Bad |
| Comp. Ex. 14 | Bad | Good | Bad |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The solder alloy, the solder composition, and the solder paste of the present invention are used in an electronic circuit board used for electrical and electronic devices or the like.

The invention claimed is:

1. A solder alloy consisting essentially of:
   tin, silver, copper, bismuth, antimony, indium, and nickel, wherein
   with respect to the total amount of the solder alloy,
   the content ratio of the silver is 0.05 mass % or more and below 0.2 mass %;
   the content ratio of the copper is 0.7 mass % or more and 1 mass % or less;
   the content ratio of the bismuth is above 4.0 mass % and 10 mass % or less;
   the content ratio of the antimony is 0.005 mass % or more and 8 mass % or less;
   the content ratio of the indium is 0.005 mass % or more and 2 mass % or less;
   the content ratio of the nickel is 0.003 mass % or more and 0.4 mass % or less; and
   the content ratio of the tin is the remaining ratio and
   the mass ratio (Bi/Ni) of the bismuth content with respect to the nickel content is 35 or more and 1500 or less.

2. The solder alloy according to claim 1, wherein
   the content ratio of the bismuth is above 4.0 mass % and 6.5 mass % or less.

3. The solder alloy according to claim 1, wherein
   the content ratio of the antimony is 0.01 mass % or more and 2.5 mass % or less.

4. The solder alloy according to claim 1, wherein
   the mass ratio (Bi/Ni) of the bismuth content with respect to the nickel content is 40 or more and 250 or less.

5. A solder paste comprising:
   a solder powder made from the solder alloy described in claim 1 and flux.

6. An electronic circuit board comprising:
   a soldering portion soldered by the solder paste described in claim 5.

* * * * *